United States Patent
Park

(10) Patent No.: US 9,473,050 B2
(45) Date of Patent: Oct. 18, 2016

(54) MOTOR STARTER SYSTEM AND METHOD FOR OPERATING SAME

(71) Applicant: LSIS CO., LTD., Anyang-si, Gyeonggi-do (KR)

(72) Inventor: Ki Hun Park, Cheongju-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 23 days.

(21) Appl. No.: 14/404,940

(22) PCT Filed: Jun. 10, 2013

(86) PCT No.: PCT/KR2013/005056
§ 371 (c)(1),
(2) Date: Dec. 1, 2014

(87) PCT Pub. No.: WO2013/187640
PCT Pub. Date: Dec. 19, 2013

(65) Prior Publication Data
US 2015/0115863 A1    Apr. 30, 2015

(30) Foreign Application Priority Data

Jun. 11, 2012 (KR) .................. 10-2012-0062289

(51) Int. Cl.
*H02H 7/09* (2006.01)
*H02P 1/26* (2006.01)
(Continued)

(52) U.S. Cl.
CPC . *H02P 1/26* (2013.01); *H02P 1/04* (2013.01); *H02P 1/32* (2013.01)

(58) Field of Classification Search
CPC .................................................. H02H 3/08
USPC ...... 361/5, 6, 21, 22, 24, 25, 27, 31, 56, 57, 361/90, 91.1, 65, 78, 89, 93.7, 93.8, 91.2, 361/165, 23, 93.1; 318/400.21, 400.22, 318/471, 472, 432, 400.01, 400.06, 400.14, 318/400.15, 799, 801, 700, 727; 307/10.6; 417/10; 180/270
See application file for complete search history.

(56) References Cited

U.S. PATENT DOCUMENTS 8,493,012 B2* 7/2013 Kellis ................. H02H 7/0816
318/430
2006/0082941 A1* 4/2006 Brandl ................. H05K 7/1459
361/93.1
(Continued)

FOREIGN PATENT DOCUMENTS

CN    101197532    6/2008
CN    101250779    8/2008
(Continued)

OTHER PUBLICATIONS

PCT International Application No. PCT/KR2013/005056, Written Opinion of the International Searching Authority dated Sep. 6, 2013, 1 page.
(Continued)

*Primary Examiner* — Antony M Paul
(74) *Attorney, Agent, or Firm* — Lee Hong Degerman Kang & Waimey; Jonathan Kang; Jeffrey Lotspeich

(57) ABSTRACT

A motor starter system and a method for operating same are disclosed. According to an embodiment of the present invention, reliability of a motor protection function during an overcurrent is improved by automatically controlling the on/off state of an electromagnetic contactor using an analog sensor value outputted from an external sensor. In addition, the present invention can receive an external sensor value through a connected upper monitoring device, monitor, in real time, the motor starter state, and transmit a control command for directly controlling the on/off state of the electromagnetic contactor, and thus enables excellent operation, integrated lifetime prediction, and motor load management. Furthermore, the present invention can reduce wiring work and a cost thereof and maximizing the use of space more than when controlling the electromagnetic contactor by using the I/O of a PLC.

9 Claims, 5 Drawing Sheets

(51) Int. Cl.
 *H02P 1/04* (2006.01)
 *H02P 1/32* (2006.01)

(56) References Cited

U.S. PATENT DOCUMENTS

2012/0133477 A1 5/2012 West
2013/0027817 A1* 1/2013 Keeramthode .......... H02H 3/44
 361/31

FOREIGN PATENT DOCUMENTS

| CN | 201307560 | 9/2009 |
| CN | 101714842 | 5/2010 |
| CN | 102185276 | 9/2011 |
| CN | 202261157 | 5/2012 |
| EP | 2184656 | 5/2010 |
| JP | 09-191555 | 7/1997 |
| KR | 10-2009-0049283 | 5/2009 |

OTHER PUBLICATIONS

The State Intellectual Property Office of the People's Republic of China Application Serial No. 201380030957.4, Office Action dated Jul. 1, 2016, 9 pages.
European Patent Office Application Serial No. 13804238.7, Search Report dated Jul. 11, 2016, 6 pages.

* cited by examiner

MOTOR STARTER SYSTEM AND METHOD FOR OPERATING SAME

CROSS-REFERENCE TO RELATED APPLICATIONS

This application is the National Stage filing under 35 U.S.C. 371 of International Application No. PCT/KR2013/005056, filed on Jun. 10, 2013, which claims the benefit of earlier filing date and right of priority to Korean Application No. 10-2012-0062289, filed on Jun. 11, 2012, the contents of which are all hereby incorporated by reference herein in their entirety.

TECHNICAL FIELD

The present invention relates to a motor starter system and a method of operating the same, and particularly, to a motor starter system and a method of operating the same, which can automatically control an electromagnetic contactor of a motor starter by using an analog sensing value output from an external sensor.

BACKGROUND ART

Examples of a method of starting a motor include a direct on line starting method and a star-delta soft starter method. The direct on line starting method is a method that directly supplies a source voltage to a motor by using an electronic switch, and the star-delta soft starter method is a method that, by using three electronic switches, converts a wiring of an induction motor into a star wiring type in starting, and converts the wiring of the induction motor into a delta wiring type in driving.

Generally, in a motor starter that starts a motor, the motor starter or an electronic motor protection relay (EMPR) is not singly used, and the motor starter is equipped in a panel (a motor control center (MCC)) in a type of a unit rack, and is used. Therefore, a wiring operation of connecting the elements is needed.

FIG. 1 illustrates a configuration of a general motor starter apparatus. As illustrated in FIG. 1, the motor starter apparatus includes a motor starter 1 in which an electromagnetic contactor and a motor protection circuit breaker are provided in a type of a unit rack, a PLC 3 that receives a user control command or processes and outputs an input signal, and a terminal block port 5. An automatic/manual selector and a software program for local control are installed in the motor starter apparatus, and the motor starter apparatus includes a plurality of relays and a plurality of wirings for controlling the electromagnetic contactor.

An operation of the motor starter apparatus will be described below. First, in order to start a motor, an on/off state of the electromagnetic contactor should be controlled by using an input/output (I/O) of the PLC 3. To this end, an analog input module of the PLC 3 receives an analog output value (for example, an output value of 4 mA to 20 mA) from an external sensor. The PLC 3 performs a program operation of controlling the on/off state of the electromagnetic contactor by using the received analog input value.

In this case, in order to control the electromagnetic contactor, the PLC 3 should know current state information of the electromagnetic contactor, and thus, an auxiliary contact should be installed in the electromagnetic contactor, and should be connected to a state processing module of the PLC 3 by wire. Also, the PLC 3 should periodically sense a state (an on or off state) of the electromagnetic contactor. Thus, an auxiliary relay for controlling the electromagnetic contactor is installed in the PLC 3, and the electromagnetic contactor is controlled by a control processing module of the PLC 3.

As described above, since the PLC 3 recognizes and processes a state of the electromagnetic contactor, many wiring operations are required for controlling the electromagnetic contactor, and moreover, a problem of securing the cost and a space is caused. Furthermore, when the analog input module or state processing module of the PLC 3 are broken down, it is unable to control an on/off state of the electromagnetic contactor, and for this reason, the motor starter cannot operate.

Disclosure of the Invention

Therefore, an object of the present invention is to provide a motor starter system and a method of operating the same, which supply a signal that switches an electromagnetic contactor to an off state for protecting a motor, or supply a signal that switches the electromagnetic contactor to an on state for driving the motor, by using an analog sensing value output from an external sensor, thereby automatically controlling driving of the electromagnetic contactor without processing by a PLC.

To achieve these and other advantages and in accordance with the purpose of the present invention, as embodied and broadly described herein, there is provided a motor starter system including: at least one or more external sensor units; a sensing value processing unit configured to receive an analog sensing value output from each of the at least one or more external sensor units to compare the received analog sensing value with a predetermined reference value, and generate and supply one of a signal for protecting a motor and a signal for driving the motor according to a result of the comparison; and a control unit configured to automatically control an electromagnetic contactor of a motor starter, based on a signal received from the sensing value processing unit and a current on or off state of the motor starter.

In an exemplary embodiment, when the analog sensing value is greater than the predetermined reference value, the sensing value processing unit may generate a first signal for protecting the motor. Also, when the analog sensing value is less than the predetermined reference value, the sensing value processing unit may generate a second signal for driving the motor. Here, the first signal may be a control signal for controlling the electromagnetic contactor to an off state, and the second signal may be a control signal for controlling the electromagnetic contactor to an on state.

In an exemplary embodiment, the motor starter system may further include a communication unit configured to transmit an on/off state of the motor starter to the remote monitoring apparatus by using RS-485 communication.

In an exemplary embodiment, in a case where a control command for switching the electromagnetic contactor to an off state is received from the remote monitoring apparatus, the control unit may execute the control command when the electromagnetic contactor is in an on state currently, and when the electromagnetic contactor is in an off state currently, the control unit may generate an NAK message to supply the NAK message to the remote monitoring apparatus.

In an exemplary embodiment, in a case where a control command for switching the electromagnetic contactor to an on state is received from the remote monitoring apparatus through the communication unit, the control unit may execute the control command when the electromagnetic contactor is in an off state currently, and when the electromagnetic contactor is in an on state currently, the control unit may generate an NAK message to supply the NAK message to the remote monitoring apparatus.

In an exemplary embodiment, the motor starter system may further include: a state monitoring unit configured to periodically monitor an on/off state of the motor starter: and a light emitting diode (LED) display unit configured to display a state of the motor starter.

In an exemplary embodiment, the motor starter system may further include a power supply configured to supply power to the sensing value processing unit and the control unit.

In another aspect of the present invention, a method of operating a motor starter system includes: receiving an analog sensing value output from an external sensor; monitoring an on/off state of an electromagnetic contactor of a motor starter; comparing the received analog sensing value with a predetermined reference value; transmitting a control command for switching the electromagnetic contactor to an off state when the analog sensing value is greater than the predetermined reference value, and when the analog sensing value is less than the predetermined reference value, transmitting a control command for switching the electromagnetic contactor to an on state; and executing the control command or generating an NAK message according to the control command and an on/off state of the electromagnetic contactor.

Advantageous Effect

In a motor starter system and a method of operating the same according to embodiments of the present invention, an on/off state of an electromagnetic contactor is automatically controlled by using an analog sensing value output from an external sensor, and thus, a reliability of a motor protection function is more enhanced when an overcurrent occurs.

Moreover, in the motor starter system and the method of operating the same according to embodiments of the present invention, a connected upper monitoring apparatus receives an external sensing value, and it is possible to monitor a motor starter state in real time. Also, a control command for directly controlling an on/off state of the electromagnetic contactor is transmitted. Accordingly, manipulability is good, a service life is predicted, and a load of a motor is conveniently managed.

Furthermore, in the motor starter system and the method of operating the same according to embodiments of the present invention, a wiring operation is more simplified and the cost is more reduced than a case in which the electromagnetic contactor is controlled by using an input/output (I/O) of a PLC in the related art, and the use of a space can be maximized. Accordingly, for example, an additional extension is easy even when a plurality of motor starters are needed.

MODES FOR CARRYING OUT THE PREFERRED EMBODIMENTS

Figure 1:
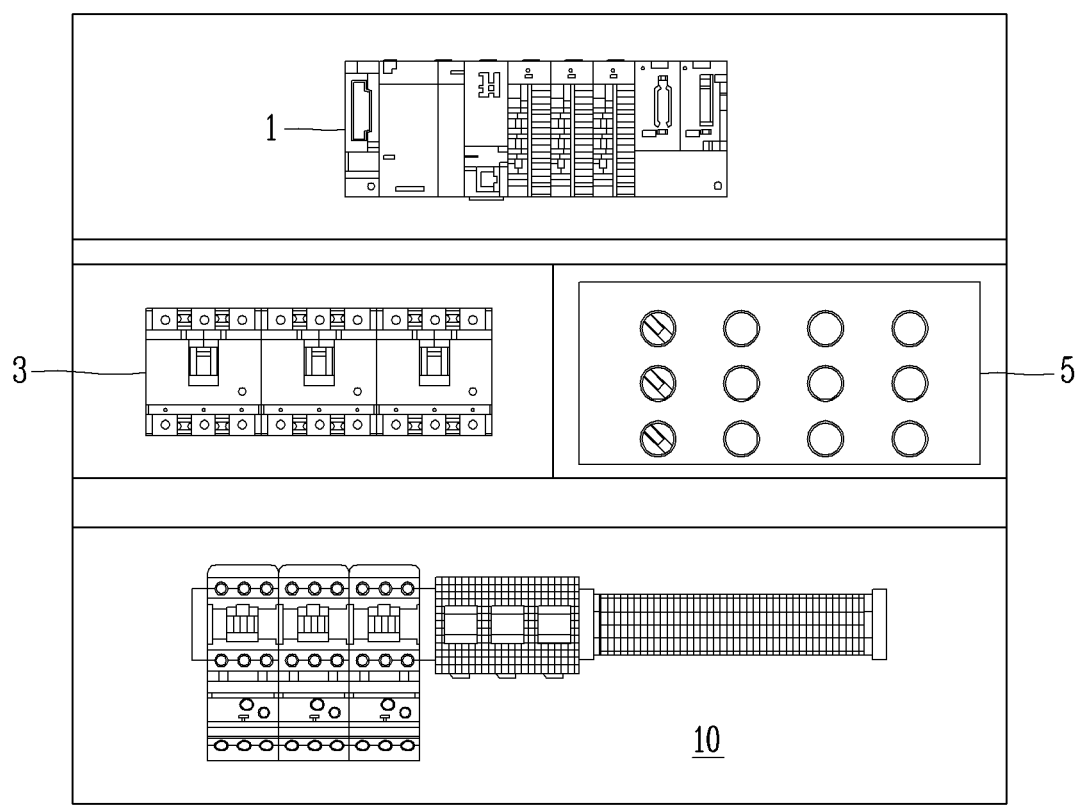
FIG. 1 is a diagram illustrating a configuration of a general motor starter apparatus.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Hereinafter, a motor starter system according to an exemplary embodiment of the present invention will be described in detail with reference to the accompanying drawings. Exemplary embodiments of the present invention capable of being easily embodied by those skilled in the art will now be described in detail with reference to the accompanying drawings. In the following description, when the detailed description of the relevant known function or configuration is determined to unnecessarily obscure the important point of the present invention, the detailed description will be omitted.

A motor starter system (or a motor control apparatus) according to an exemplary embodiment of the present invention includes: at least one or more external sensor units; a sensing value processing unit configured to receive an analog sensing value output from each of the at least one or more external sensor units to compare the received analog sensing value with a predetermined reference value, and generate and supply one of a signal for protecting a motor and a signal for driving the motor according to a result of the comparison; and a control unit configured to automatically control an electromagnetic contactor of a motor starter, based on a signal received from the sensing value processing unit and a current on or off state of the motor starter.

Moreover, a motor control apparatus according to an exemplary embodiment disclosed in the present specification includes: one or more sensor units; an electromagnetic contactor connected to a motor, and configured to perform an on or off operation; and a control unit configured to compare a reference value with a sensing value output from each of the one or more sensor units, generate a control signal based on a result of the comparison, and control an on or off operation of the electromagnetic contactor based on the control signal to stop or operate the motor.

Moreover, according to an exemplary embodiment, the control signal may include a first signal for turning off the electromagnetic contactor and a second signal for turning on the electromagnetic contactor.

Moreover, according to an exemplary embodiment, when the sensing value is greater than the predetermined reference value, the control unit may generate the first signal to protect the motor, and when the sensing value is less than the predetermined reference value, the control unit may generate the second signal to drive the motor.

Moreover, according to an exemplary embodiment, the motor control apparatus may further include a communication unit configured to communicate with a remote monitoring apparatus. In a case where a control command for switching the electromagnetic contactor to an off state is received from the remote monitoring apparatus through the communication unit, the control unit may execute the control command when the electromagnetic contactor is in an on state currently, and when the electromagnetic contactor is in an off state currently, the control unit may generate an NAK message to supply the NAK message to the remote monitoring apparatus.

Moreover, according to an exemplary embodiment, the motor control apparatus may further include a communication unit configured to communicate with a remote monitoring apparatus. In a case where a control command for switching the electromagnetic contactor to an on state is received from the remote monitoring apparatus through the communication unit, the control unit may execute the control command when the electromagnetic contactor is in an off state currently, and when the electromagnetic contactor is in an on state currently, the control unit may generate an NAK message to supply the NAK message to the remote monitoring apparatus.

Moreover, according to an exemplary embodiment, the motor control apparatus may further include a motor protection circuit breaker configured to protect the motor in connection with the electromagnetic contactor.

Moreover, according to an exemplary embodiment, the control unit may monitor a state of the motor protection circuit breaker.

Here, when the state of the motor protection circuit breaker is a normal state, the motor protection circuit breaker may be in an on state, and when the state of the motor protection circuit breaker is an abnormal state due to the breakdown of a system (or a connected load), the motor protection circuit breaker may be in an off state.

Moreover, according to an exemplary embodiment, when a state of the motor protection circuit breaker is an abnormal state, the control unit may perform control so that the electromagnetic contactor is turned off.

Moreover, according to an exemplary embodiment, the sensing value may be analog information.

Moreover, according to an exemplary embodiment, the one or more sensor units may include at least one of a pressure sensor, a temperature sensor, and a level sensor.

Hereinafter, a configuration of a motor starter system 100 according to an exemplary embodiment of the present invention will be described in more detail with reference to FIGS. 2 and 3.

Figure 3:
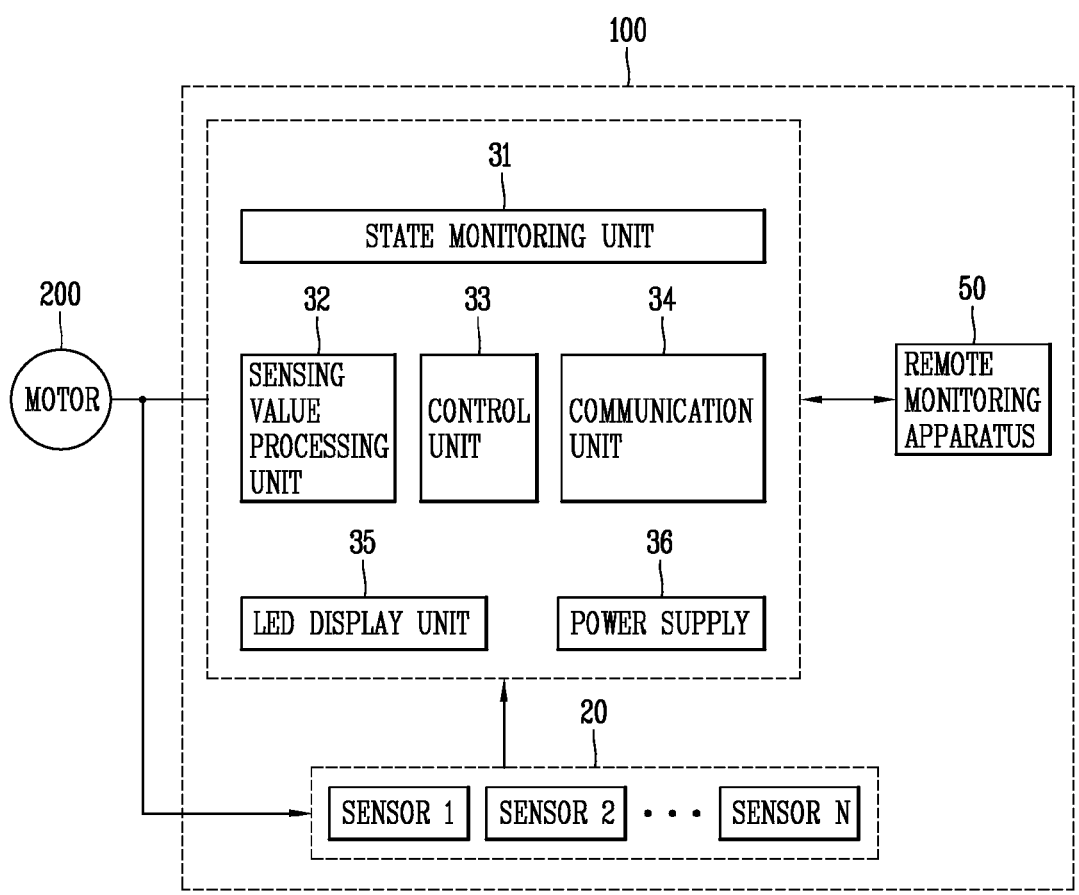
FIG. 3 is a diagram illustrating a detailed configuration of a motor starter system according to an exemplary embodiment of the present invention.

Referring to FIG. 3, the motor starter system 100 includes a sensor unit 20, a motor starter module 30 that receives an analog sensing value from the sensor unit 20, and a remote monitoring apparatus 50 that communicates with the motor starter module 30. The motor starter system 100 may control an on/off state of an electromagnetic contactor which is included in the motor starter system 100, and thus start the motor 200 connected thereto or protect the motor 200 when an overcurrent occurs.

The sensor unit 20 may be configured with one or more external sensors. The sensor unit 20 may include, for example, a pressure sensor, a temperature sensor, and a level sensor. An analog output value (for example, 4 mA to 20 mA) detected from the sensor unit 20 may be supplied to the motor starter module 30 and/or the remote monitoring apparatus 30.

The motor starter module 30 may include a motor protection circuit breaker and an electromagnetic contactor. Also, the motor starter module 30 may include a sensing value processing unit 32 that processes a sensing value input from the sensor unit 20, a state monitoring unit 31 that monitors an on/off state of the electromagnetic contactor, and a control unit 33 that generates a control command for automatically controlling the on/off state of the electromagnetic contactor.

The sensing value processing unit 32 may receive an analog sensing value output from the sensor unit 20. Also, the sensing value processing unit 32 may compare the analog sensing value with a predetermined reference value, and generate a signal for protecting the motor 200 or a signal for driving the motor 200 according to a result of the comparison.

In detail, when the analog sensing value is greater than the predetermined reference value, the sensing value processing unit 32 may generate a first signal for protecting the motor 200. Also, when the analog sensing value is less than the predetermined reference value, the sensing value processing unit 32 may generate a second signal for driving the motor 200. Here, the first signal may be a control signal for controlling the electromagnetic contactor to an off state to stop the motor 200, and the second signal may be a control signal for controlling the electromagnetic contactor to an on state to drive the motor 200.

The predetermined reference value is a setting value within a normal range which enables the motor 200 to operate, and for example, the predetermined reference value may be a value which is previously input at an initial stage, where a motor starter is installed, or is received from the remote monitoring apparatus 50. For example, in a case where the reference value is a current value of 10 mA, when an analog input value output from the sensor unit 20 is greater than a current value of 10 mA, the sensing value processing unit 32 may determine the analog input value as an overcurrent, and generate the first signal (i.e., a control signal which drives a movable contact of the electromagnetic contactor to cause an off state) for protecting the motor 200.

The control unit 33 may sense a signal received from the sensing value processing unit 32 and an on/off state of the motor starter, and may automatically control the electromagnetic contactor of the motor starter, based on the sensed signal and on/off state.

Moreover, the control unit 33 may process a control command transmitted from the remote monitoring apparatus 50. That is, in a case where a control command which switches the electromagnetic contactor to an off state is received from the remote monitoring apparatus 50, when the electromagnetic contactor is in an on state currently, the control unit 33 may execute the control command to switch the electromagnetic contactor to an off state. Also, the control unit may inform the remote monitoring apparatus 50 of that the control command has been executed. On the other hand, when the electromagnetic contactor is in an off state currently, the control unit 33 may generate an NAK message, and supply the NAK message to the remote monitoring apparatus 50.

Similarly, in a case where a control command which switches the electromagnetic contactor to an on state is received from the remote monitoring apparatus 50, when the electromagnetic contactor is in an on state currently, the control unit 33 may execute the control command to switch the electromagnetic contactor to an off state. Also, the control unit may inform the remote monitoring apparatus 50 of that the control command has been executed. On the other hand, when the electromagnetic contactor is in an on state currently, the control unit 33 may generate an NAK message, and supply the NAK message to the remote monitoring apparatus 50.

The motor starter module 30 may further include a communication unit 34 for communicating with the remote monitoring apparatus 50, a light emitting diode (LED) display unit 35, and a power supply 36.

The communication unit 34 may transmit an on/off state of the motor starter to the remote monitoring apparatus 50 by using RS-485 communication. Also, the communication unit 34 may receive, from the remote monitoring apparatus 50, a control signal for controlling a state of the motor starter.

The LED display unit 35 may display a state of the motor starter. For example, when the movable contact of the electromagnetic contactor of the motor starter is driven and is in an on state, the LED display unit 35 may inform the starting of the motor 200 by turning on an LED. On the other hand, when the electromagnetic contactor of the motor starter is in an off state, the LED display unit 35 may turn off the LED. In another exemplary embodiment, the LED display unit 35 may display an on/off state of the electromagnetic contactor by changing a color of the LED. Also, the LED display unit 35 may include a display screen, and display letters through an LED window.

The power supply 36 may supply power to the sensing value processing unit 32 and the control unit 33.

The motor starter system 100 may further include a memory (not shown) that stores a history of a sensing value output from the external sensor unit 20 and the predetermined reference value.

The remote monitoring apparatus 50 may monitor, in real time, an analog sensing value output from the sensor unit 20 and states of the motor protection circuit breaker and electromagnetic contactor of the motor starter. Also, the remote monitoring apparatus 50 may monitor the number of operations and/or the number of electrical connections of the movable contact of the magnetic contact. Furthermore, the motor starter system 100 according to an exemplary embodiment of the present invention may control a state of the electromagnetic contactor by using an on/off switch, based on a local function.

Figure 2:
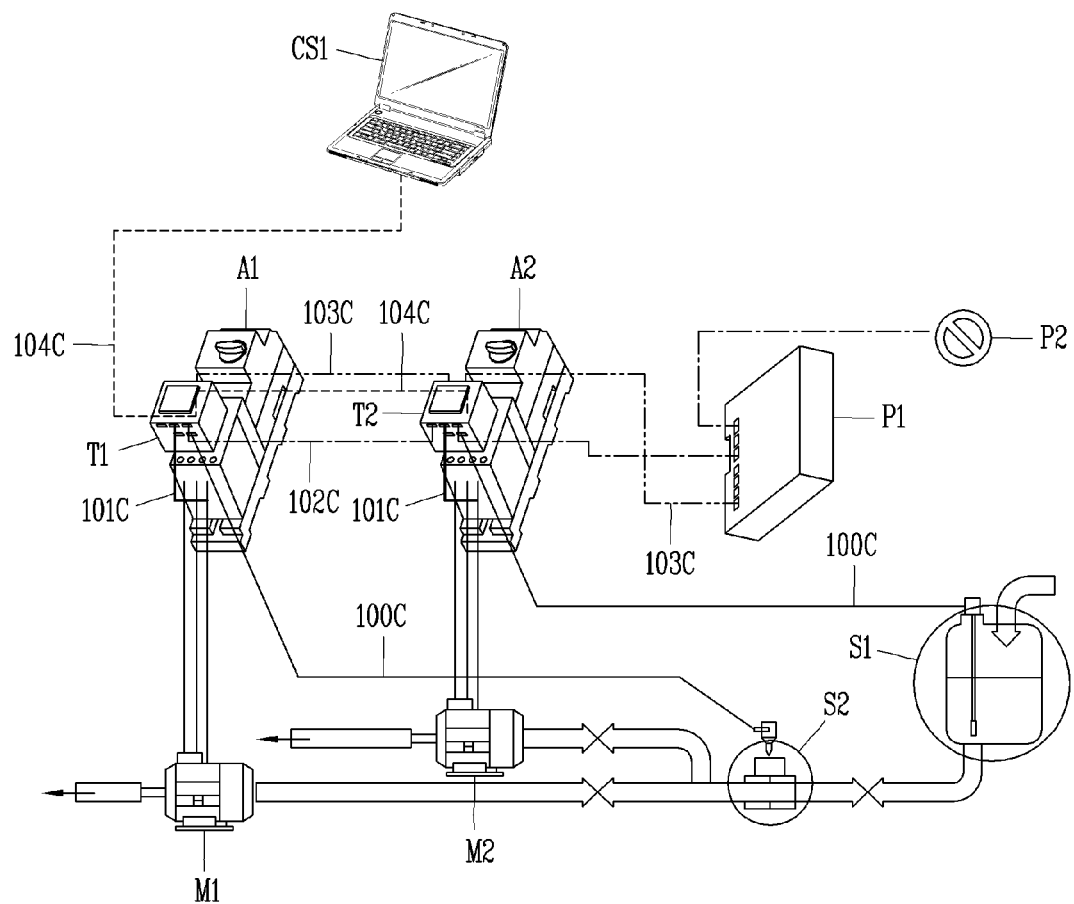
FIG. 2 is a diagram illustrating a configuration of a motor starter system according to an exemplary embodiment of the present invention.

FIG. 2 illustrates a connection state of a cable in detail, in a configuration of the motor starter system according to an exemplary embodiment of the present invention.

As illustrated in FIG. 2, a direct current (DC) voltage P2 of about 220 V may be supplied to a plurality of motor starters A1 and A2 through a power supply P1 (102C). Also, a DC voltage of about 12 V may be supplied through an operation power cable 103C, for operating a plurality of motor starter modules T1 and T2.

A plurality of external sensors S1 and S2, such as a pressure sensor and a temperature sensor which are connected to a plurality of motors M1 and M2, may supply detected analog sensing values (for example, a sensing value 100C within a range from 4 mA to 20 mA) to the motor starter modules T1 and T2.

The detected analog sensing value 100C may be transferred to an upper remote monitoring apparatus CS1 through an RS-485 communication cable 104C. When a control command for changing a state of an electromagnetic contactor is transferred to the electromagnetic contactor through an MC control connection cable 101C, a contact of the electromagnetic contactor may be driven, and may start or stop the motors M1 and M2 connected thereto.

A control command for driving an on/off state of the electromagnetic contactor may be transmitted from the remote monitoring apparatus CS1 or a control unit of each of the motor starter modules T1 and T2. To this end, the remote monitoring apparatus CS1 may exchange one or more signals with the motor starter modules T1 and T2 through the RS-485 communication cable 104C. For example, the motor starter modules T1 and T2 may periodically monitor states of the electromagnetic contactor and a motor protection circuit breaker, and when a state value transmission request is received from the remote monitoring apparatus CS1, each of the motor starter modules T1 and T2 may transmit a corresponding state value through the RS-485 communication cable 104C.

Here, when a state of the motor protection circuit breaker is a normal state, the motor protection circuit breaker may be in an on state, and when the state of the motor protection circuit breaker is an abnormal state due to the breakdown of a system (or a connected load), the motor protection circuit breaker may be in an off state.

Figure 4:
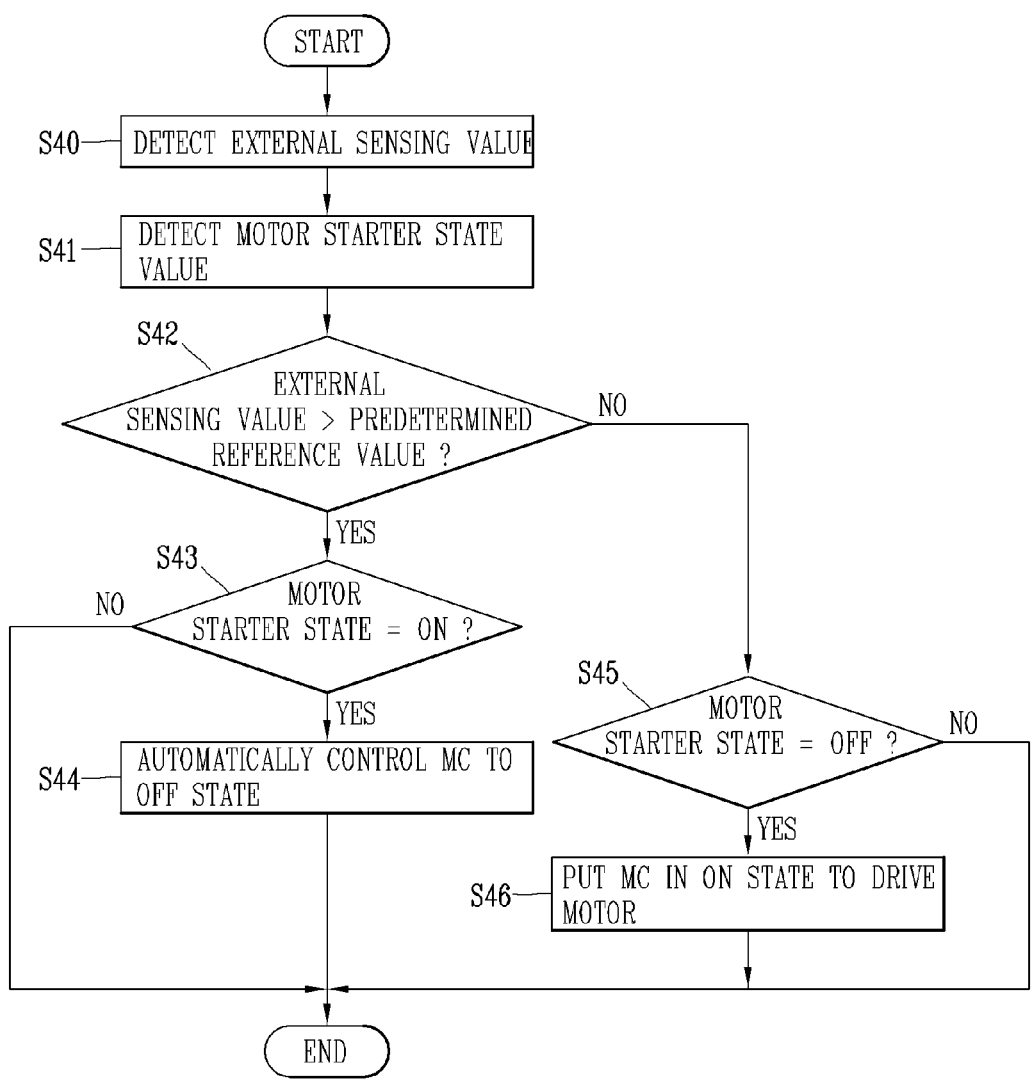
FIG. 4 is a flowchart illustrating an operation of a motor starter system according to an exemplary embodiment of the present invention.
Figure 5:
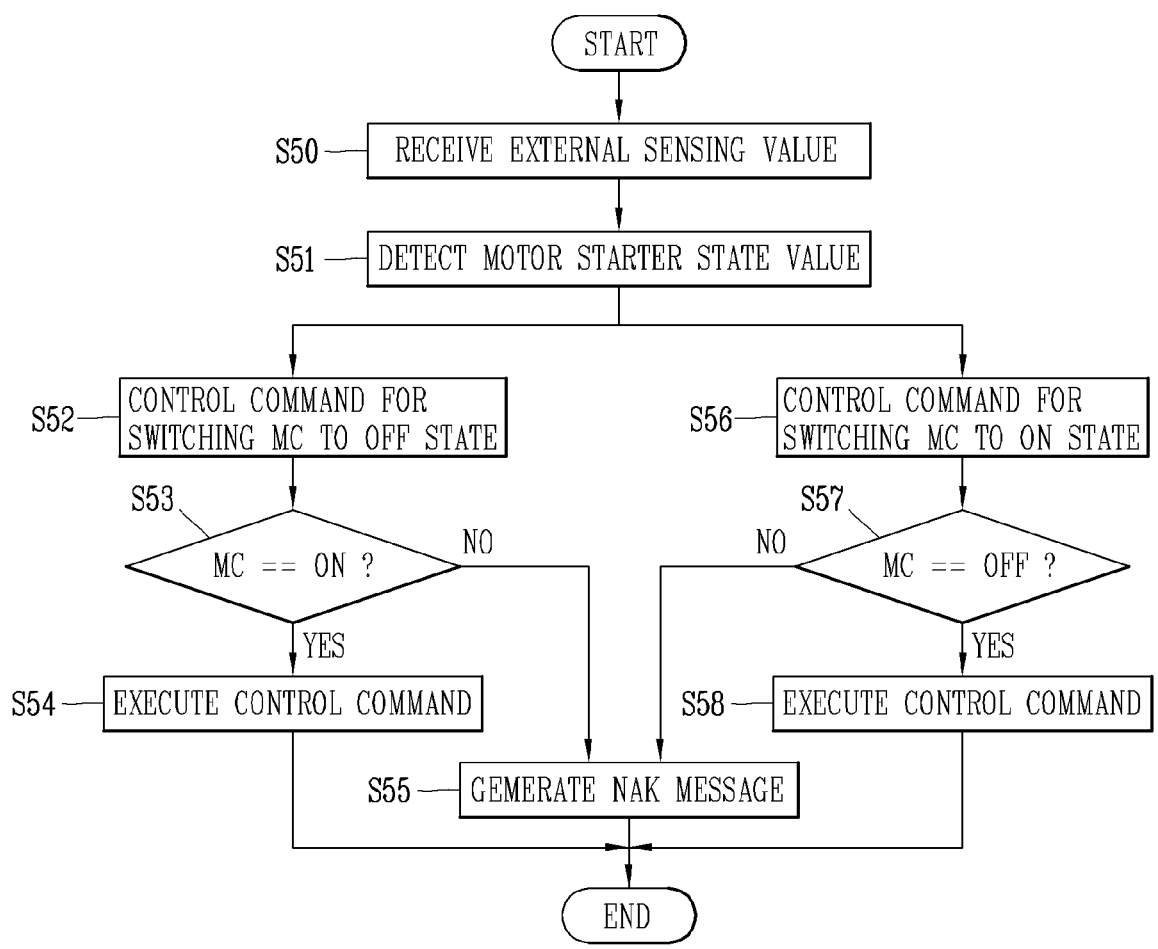
FIG. 5 is a flowchart illustrating another operation of a motor starter system according to an exemplary embodiment of the present invention.

FIGS. 4 and 5 illustrate a method of operating the motor starter system according to an exemplary embodiment of the present invention.

The motor starter system according to an exemplary embodiment of the present invention may be remotely monitored and controlled by the remote monitoring apparatus 50. The remote monitoring apparatus 50 may receive an analog sensing value output from an external sensor. Also, the remote monitoring apparatus 50 may monitor an on/off state of an electromagnetic contactor of a motor starter connected thereto. An on/off state of the motor starter may be transferred as a signal by using RS-485 communication. The remote monitoring apparatus 50 may compare an analog sensing value, received from the external sensor, with a predetermined reference value, namely, a normal setting value.

When the received analog sensing value is greater than the predetermined reference value as a result of the comparison, this may correspond to an overcurrent. Therefore, the remote monitoring apparatus 50 may transmit a control command for putting the electromagnetic contactor of the motor starter in an off state, so as to protect a motor.

On the other hand, when the received analog sensing value is less than the predetermined reference value as a result of the comparison, the remote monitoring apparatus 50 may determine a normal range which enables the motor to be driven, and transmit a control command for putting the electromagnetic contactor of the motor starter in an on state.

Then, a motor starter module may execute the control command or generate an NAK message according to the control command received from the remote monitoring apparatus 50 and an on/off state of the electromagnetic contactor.

In detail, a control command for putting the electromagnetic contactor in an off state may be received from the remote monitoring apparatus 50, and when the electromagnetic contactor is in an on state currently, the motor starter module may execute the control command to switch the electromagnetic contactor to an off state. On the other hand, a control command for putting the electromagnetic contactor in an off state may be received from the remote monitoring apparatus 50, but when the electromagnetic contactor is in an off state, the motor starter module may generate an NAK message, and transfer the NAK message to the remote monitoring apparatus 50. Similarly, a control command for putting the electromagnetic contactor in an on state may be received from the remote monitoring apparatus 50, and when the electromagnetic contactor is in an off state currently, the motor starter module may execute the control command to switch the electromagnetic contactor to an on state. On the other hand, a control command for putting the electromagnetic contactor in an on state may be received from the remote monitoring apparatus 50, but when the electromagnetic contactor is in an on state, the motor starter module may generate an NAK message, and transfer the NAK message to the remote monitoring apparatus 50.

FIG. 4 illustrates an operation of a motor starter system according to an exemplary embodiment of the present invention. First, in operation S40, an analog sensing value may be detected from an external sensor. In operation S41, an on/off state value of a motor starter may be detected. In operation S42, the motor starter system may determine whether the sensing value, which is detected in operation S40, is greater than a predetermined reference value, namely, a normal setting value range for driving a motor.

When it is determined that the detected sensing value is greater than the predetermined reference value and the motor starter is in an on state in operation S43, the motor starter system may circuit-short a movable contact of an electromagnetic contactor to put the movable contact of the electromagnetic contactor in an off state. Therefore, the motor is stopped, and thus is protected from an overcurrent.

When it is determined that the detected sensing value is less than the predetermined reference value and the motor starter is in an off state in operation S45, the motor starter system may put the electromagnetic contactor in an on state to drive the motor.

As described above, the motor starter system can automatically control an on/off state of the electromagnetic contactor by using the analog sensing value output from the external sensor, thereby enhancing a reliability of a motor protection function.

FIG. 5 illustrates another operation of a motor starter system according to an exemplary embodiment of the present invention, namely, illustrates a case in which a motor starter is remotely controlled by the remote monitoring apparatus 50.

First, in operation S50, the remote monitoring apparatus 50 may receive an analog sensing value output from each of one or more external sensors. In operation S51, the remote monitoring apparatus 50 may receive an on/off state of a motor starter by using, for example, RS-485 communication. The remote monitoring apparatus 50 may generate a control signal for changing a state of an electromagnetic contactor for protecting or driving a motor by using the analog sensing value and a state value of the motor starter which are received.

That is, when the received analog sensing value corresponds to a case in which the motor is protected from an overcurrent, the remote monitoring apparatus 50 may transmit a control command for switching the electromagnetic contactor, included in the motor starter, to an off state in operation S52. The remote monitoring apparatus 50 may monitor a state of the electromagnetic contactor of the motor starter in operation S53, and when the electromagnetic contactor is in an on state, the remote monitoring apparatus 50 may switch the electromagnetic contactor to an off state in operation S54. When the electromagnetic contactor is in an off state, the remote monitoring apparatus 50 may generate an NAK message in operation S55.

On the other hand, when the received analog sensing value is a value within a normal range which enables the motor to be driven, the remote monitoring apparatus 50 may transmit a control command for switching the electromagnetic contactor, included in the motor starter, to an on state in operation S56. The remote monitoring apparatus 50 may monitor a state of the electromagnetic contactor of the motor starter in operation S57, and when the electromagnetic contactor is in an off state, the remote monitoring apparatus 50 may switch the electromagnetic contactor to an on state in operation S58. When the electromagnetic contactor is in an on state, the remote monitoring apparatus 50 may generate an NAK message in operation S55.

According to the exemplary embodiments of the present invention, a connected upper monitoring apparatus receives an external sensing value, and it is possible to monitor a motor starter state in real time. Also, a control command for directly controlling an on/off state of the electromagnetic contactor is transmitted. Accordingly, manipulability is good, a service life is predicted, and a load of a motor is conveniently managed.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, in a motor starter system and a method of operating the same according to embodiments of the present invention, an on/off state of an electromagnetic contactor is automatically controlled by using an analog sensing value output from an external sensor, and thus, a reliability of a motor protection function is more enhanced when an overcurrent occurs. Also, a connected upper monitoring apparatus receives an external sensing value, and it is possible to monitor a motor starter state in real time. Also, a control command for directly controlling an on/off state of the electromagnetic contactor is transmitted. Accordingly, manipulability is good, a service life is predicted, and a load of a motor is conveniently managed. Also, a wiring operation is more simplified and the cost is more reduced than a case in which the electromagnetic contactor is controlled by using an input/output (I/O) of a PLC in the related art, and the use of a space can be maximized.

The invention claimed is:

1. A motor control apparatus comprising:
   one or more sensor units;
   an electromagnetic contactor connected to a motor, and configured to perform an on or off operation;
   a control unit configured to compare a reference value with a sensing value output from each of the one or more sensor units, generate a control signal based on a result of the comparison, and control an on or off operation of the electromagnetic contactor based on the control signal to stop or operate the motor; and
   a communication unit configured to communicate with a remote monitoring apparatus,
   wherein in a case where a control command for switching the electromagnetic contactor to an off state is received from the remote monitoring apparatus through the communication unit,
   when the electromagnetic contactor is in an on state currently, the control unit executes the control command, and
   when the electromagnetic contactor is in an off state currently, the control unit generates an NAK message to supply the NAK message to the remote monitoring apparatus.

2. The motor control apparatus of claim 1, wherein the control signal comprise a first signal for turning off the electromagnetic contactor and a second signal for turning on the electromagnetic contactor.

3. The motor control apparatus of claim 2, wherein,
   when the sensing value is greater than the predetermined reference value, the control unit generates the first signal to protect the motor, and
   when the sensing value is less than the predetermined reference value, the control unit generates the second signal to drive the motor.

4. The motor control apparatus of claim 1, further comprising a motor protection circuit breaker configured to protect the motor in connection with the electromagnetic contactor.

5. The motor control apparatus of claim 4, wherein the control unit monitors a state of the motor protection circuit breaker.

6. The motor control apparatus of claim 5, wherein when a state of the motor protection circuit breaker is an abnormal state, the control unit performs control so that the electromagnetic contactor is turned off.

7. The motor control apparatus of claim 1, wherein the sensing value is analog information.

8. The motor control apparatus of claim 1, wherein the one or more sensor units comprise at least one of a pressure sensor, a temperature sensor, or a level sensor.

9. A motor control apparatus comprising:
one or more sensor units;
an electromagnetic contactor connected to a motor, and configured to perform an on or off operation;
a control unit configured to compare a reference value with a sensing value output from each of the one or more sensor units, generate a control signal based on a result of the comparison, and control an on or off operation of the electromagnetic contactor based on the control signal to stop or operate the motor; and
a communication unit configured to communicate with a remote monitoring apparatus,
wherein in a case where a control command for switching the electromagnetic contactor to an on state is received from the remote monitoring apparatus through the communication unit,
when the electromagnetic contactor is in an off state currently, the control unit executes the control command, and
when the electromagnetic contactor is in an on state currently, the control unit generates an NAK message to supply the NAK message to the remote monitoring apparatus.

* * * * *